(12) United States Patent
Chen

(10) Patent No.: US 11,507,995 B2
(45) Date of Patent: Nov. 22, 2022

(54) INFORMATION RECOMMENDATION SYSTEM AND METHOD

(71) Applicant: HOP LION FEATHER WORKS CORP., Taipei (TW)

(72) Inventor: Yen-Chen Chen, Taipei (TW)

(73) Assignee: Hop Lion Feather Works Corp., Taipei (TW)

( * ) Notice: Subject to any disclaimer, the term of this patent is extended or adjusted under 35 U.S.C. 154(b) by 721 days.

(21) Appl. No.: 16/373,671

(22) Filed: Apr. 3, 2019

(65) Prior Publication Data

US 2020/0111149 A1 Apr. 9, 2020

(30) Foreign Application Priority Data

Oct. 8, 2018 (TW) .................................. 107135364

(51) Int. Cl.
G06Q 30/00 (2012.01)
G06Q 30/06 (2012.01)
G06F 16/9535 (2019.01)
G06F 3/0482 (2013.01)

(52) U.S. Cl.
CPC ....... *G06Q 30/0631* (2013.01); *G06F 3/0482* (2013.01); *G06F 16/9535* (2019.01); *G06Q 30/0627* (2013.01)

(58) Field of Classification Search
USPC ...................................................... 705/26.7
See application file for complete search history.

(56) References Cited

U.S. PATENT DOCUMENTS

| | | | | |
|---|---|---|---|---|
| 11,004,551 | B2* | 5/2021 | Hashizaki | G09B 19/00 |
| 2002/0045959 | A1* | 4/2002 | Van Overveld | G06Q 30/02 |
| | | | | 700/90 |
| 2012/0110747 | A1* | 5/2012 | Yum | D06F 34/05 |
| | | | | 8/137 |
| 2016/0055569 | A1* | 2/2016 | Berg | G06Q 30/0631 |
| | | | | 705/26.7 |

(Continued)

OTHER PUBLICATIONS

Abdel-Rehim, Z., Saad, M., El-Shakankery, M., Hanafy, I., Textile Fabrics As Thermal Insulators, Sep. 2006, AUTEX Research Journal, vol. 6, No. 3, pp. 148-161. (Year: 2006).*

*Primary Examiner* — Jeffrey A. Smith
*Assistant Examiner* — Brittany E Bargeon
(74) *Attorney, Agent, or Firm* — Rosenberg, Klein & Lee

(57) ABSTRACT

An information recommendation system and method of the present invention provide a user interface for the user to operate and thereby to generate some confirmation signals. A processing unit calculates recommendation parameters respectively based on aforesaid confirmation signals which includes a temperature confirmation signal, a physique confirmation signal, a residence confirmation signal, and a wearing habit confirmation signal. In another word, the generation of the recommendation information is based on the user's residence temperature and climate as well as the user's physique and wearing habits, and in particular, by further calculating on every recommendation parameters. Therefore, the products recommended by the recommendation information can better match the user's residence and habits whereby increasing the product fitness and decreasing the chances of waste due to unfitness.

2 Claims, 9 Drawing Sheets

(56) References Cited

U.S. PATENT DOCUMENTS

| | | | |
|---|---|---|---|
| 2016/0151603 A1* | 6/2016 | Shouldice | A61B 5/4806 |
| | | | 600/26 |
| 2016/0321547 A1* | 11/2016 | Johnson | G06Q 10/087 |
| 2017/0076011 A1* | 3/2017 | Gannon | G06F 16/5866 |
| 2017/0276507 A1* | 9/2017 | Zacharenko | G06F 16/904 |
| 2019/0188773 A1* | 6/2019 | Chu | G06F 16/5866 |
| 2021/0118560 A1* | 4/2021 | Bastide | G16H 50/20 |

\* cited by examiner

INFORMATION RECOMMENDATION SYSTEM AND METHOD

CROSS REFERENCE TO RELATED APPLICATION(S)

This non-provisional application claims the benefit under 35 U.S.C. § 119(e) to patent application No. 107135364 filed in Taiwan on Oct. 8, 2018, which is hereby incorporated in its entirety by reference into the present application.

BACKGROUND OF THE INVENTION

1. Field of the Invention

The present invention is related to a recommendation system and method, especially about an information recommendation system and method.

2. Description of the Related Art

When consumers purchase goods, many of them go directly to the stores where the goods are sold, and the store clerks will then recommend the products to be purchased by the consumers. For some personal use products, such as quilts/comforters/duvets, consumers often can only rely on the recommendation of the clerks, unless there are real products on the spot and consumers are allowed to physically feel the products to make purchasing decisions.

However, consumers often are not fully aware of the environment and personal proclivity under which these personal use products are to be used. Therefore, it is quite often that after being purchased and used, a personal use product will be found that it is not fit for a specific consumer. Thus, not only does a consumer purchase an unfit product, which causes waste of money, but the consumer also stops using the product because of unfitness, and the product becomes a waste due to unfitness and virtually turned into garbage.

SUMMARY OF THE INVENTION

The purpose of the present invention is to ameliorate aforesaid current product purchasing pitfalls by providing an information recommendation system and an information recommendation method disclosed herein.

The information recommendation system of the present invention includes a location information generating unit which generates location information, a network unit which providing connection to a server, a display unit, a user interface, and a processing unit electrically connected to the location information generating unit, the network unit, the display unit and the user interface; wherein the processing unit reads the location information and uploads the location information to the server through the network unit, and then reads temperature information from the server; wherein, the processing unit displays the temperature information through the display unit, and determines whether the user interface generates a temperature adjustment signal, when the user interface does not generate the temperature adjustment signal, the processing unit determines whether the user interface generates a temperature confirmation signal; wherein, when the user interface generates the temperature confirmation signal, the processing unit generates first recommendation parameter based on the temperature information displayed by the display unit, then the processing unit displays physique reference information through the display unit and determines whether a physique confirmation signal is generated by the user interface, wherein, when the user interface generates the physique confirmation signal, the processing unit generates second recommendation parameter based on the physique confirmation signal, then the processing unit displays residence climate reference information through the display unit and determines whether a residence confirmation signal is generated by the user interface, wherein, when the user interface generates the residence confirmation signal, the processing unit generates third recommendation parameter based on the residence confirmation signal, then the processing unit displays wearing habit reference information through the display unit and determines whether a wearing habit confirmation signal is generated by the user interface, wherein, when the user interface generates the wearing habit confirmation signal, the processing unit generates fourth recommendation parameter based on the wearing habit confirmation signal, and then the processing unit calculates a sum of the first recommendation parameter to the fourth recommendation parameter, and generates recommendation information which is displayed by the display unit.

The information recommendation method of the present invention includes the following steps:

Read location information;

Upload the location information to a server, and then read temperature information from the server;

Display the temperature information, and then determine whether a temperature adjustment signal is generated;

When the temperature adjustment signal is not generated, then, determine whether a temperature confirmation signal is generated;

When the temperature confirmation signal is generated, generate a first recommendation parameter according to the displayed temperature information, then, display a physique reference information, and then determine whether a physique confirmation signal is generated;

When the physique confirmation signal is generated, generate a second recommendation parameter according to the physique confirmation signal, then display residence climate reference information, and then determine whether a residence confirmation signal is generated;

When the residence confirmation signal is generated, generate a third recommendation parameter according to the residence confirmation signal, then display a wearing habit reference information, and then determine whether a wearing habit confirmation signal is generated; and When the wearing habit confirmation signal is generated, generate a fourth recommendation parameter according to the wearing habit confirmation signal, then calculate a sum of the first recommendation parameter to the fourth recommendation parameter, then generate recommendation information according to the sum and display the recommendation information.

In short, the information recommendation system and method of the present invention can calculate recommendation parameters according to various confirmation signals that are generated by a user operating the user interface, wherein, the confirmation signal includes the temperature confirmation signal, the physique confirmation signal, the residence confirmation signal, and the wearing habit confirmation signal. In other words, the recommendation information is generated according to the ambient temperature and climate of the residence of the user and the physique and wearing habits of the user, hence the products recommended can better conform to the user's living environment and habits, and better match the user to reduce the chances of waste due to unfitness.

DETAILED DESCRIPTION OF THE INVENTION

These and other aspects of the embodiments herein will be better appreciated and understood when considered in conjunction with the following description and the accompanying drawings.

Figure 1:
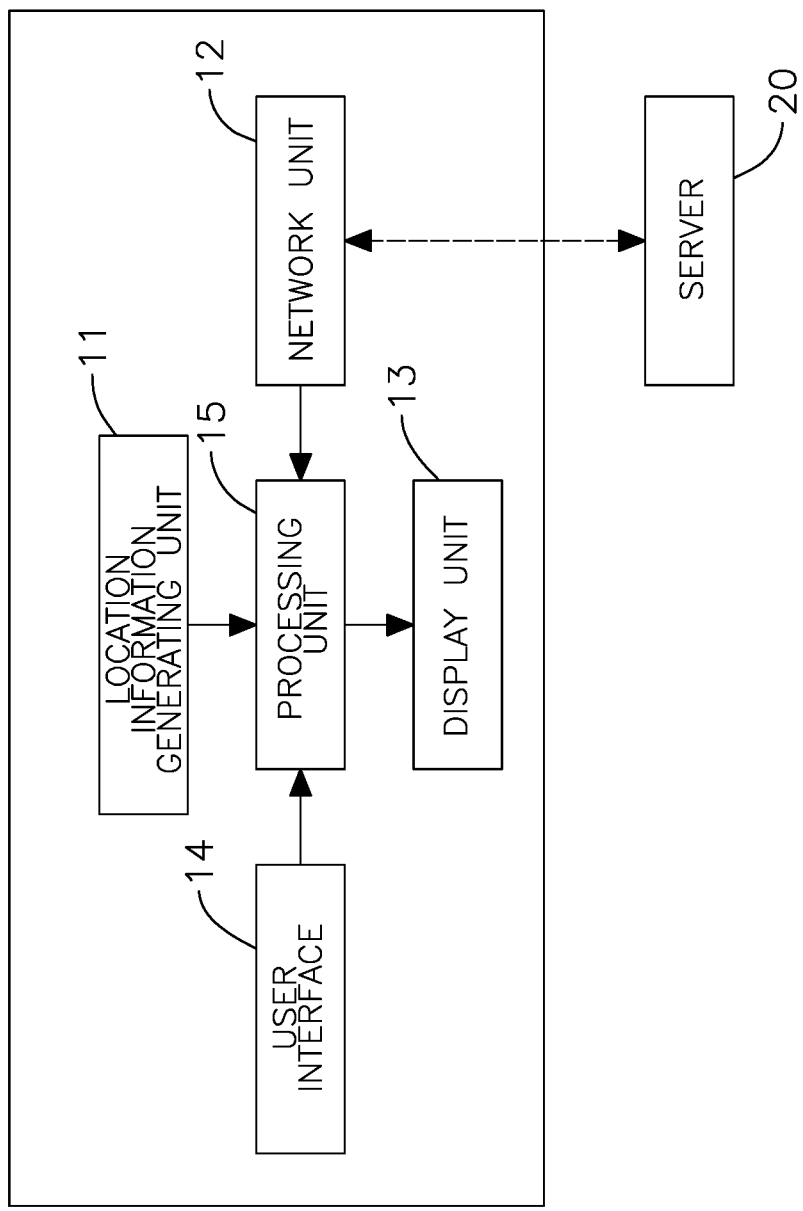
FIG. 1 is a block diagram of an information recommendation system of the present invention.

With reference to FIG. 1, the information recommendation system includes a location information generating unit 11, a network unit 12, a display unit 13, a user interface 14, and a processing unit 15.

The location information generating unit 11 generates location information. The network unit 12 is connected to a server 20. The processing unit 15 is electrically connected to the location information generating unit 11, the network unit 12, the display unit 13, and the user interface 14.

The processing unit 15 reads the location information, uploads the location information to the server 20 through the network unit 12, and reads temperature information from the server 20.

The processing unit 15 displays the temperature information through the display unit 13, and determines whether the user interface 14 generates a temperature adjustment signal. When the user interface 14 does not generate the temperature adjustment signal, the processing unit 15 further determines whether the user interface 14 generates a temperature confirmation signal.

When the user interface 14 generates the temperature confirmation signal, the processing unit 15 generates a first recommendation parameter according to the temperature information displayed by the display unit 13. Then, the processing unit 15 displays physique reference information through the display unit 13, and determines whether the user interface 14 generates a physique confirmation signal.

When the user interface 14 generates the physique confirmation signal, the processing unit 15 generates a second recommendation parameter according to the physique confirmation signal, and displays residence climate reference information through the display unit, and determines whether the user interface 14 generates a residence confirmation signal.

When the user interface 14 generates the residence confirmation signal, the processing unit 15 generates a third recommendation parameter according to the residence confirmation signal, and the processing unit 15 displays a wearing habit reference information through the display unit 13 and determines whether the user interface 14 generates a wearing habit confirmation signal.

When the user interface 14 generates the wearing habit confirmation signal, the processing unit 15 generates a fourth recommendation parameter according to the wearing habit confirmation signal, and then the processing unit 15 calculates the sum of the first recommendation parameter to the fourth recommendation parameter, and generates recommendation information based on the sum of the parameters, and finally the recommendation information is displayed through the display unit 13.

In addition, before the processing unit 15 reads the location information, the processing unit 15 first determines whether the location information generating unit 11 generates the location information. When the location information generating unit 11 generates the location information, the processing unit 15 reads the location information, and performs subsequent steps according to the aforementioned content.

Whereas, when the location information generating unit 11 does not generate the location information, the processing unit 15 won't be able to read the location information, then by itself, the processing unit 15 directly generates temperature information according to a preset temperature value, and displays the temperature information through the display unit 13.

Moreover, when the user interface 14 generates the temperature adjustment signal, the processing unit 15 adjusts the temperature information displayed by the display unit according to the temperature adjustment signal.

When the user interface does not generate the temperature confirmation signal, the processing unit re-determines whether the user interface generates the temperature adjustment signal.

Figure 2:
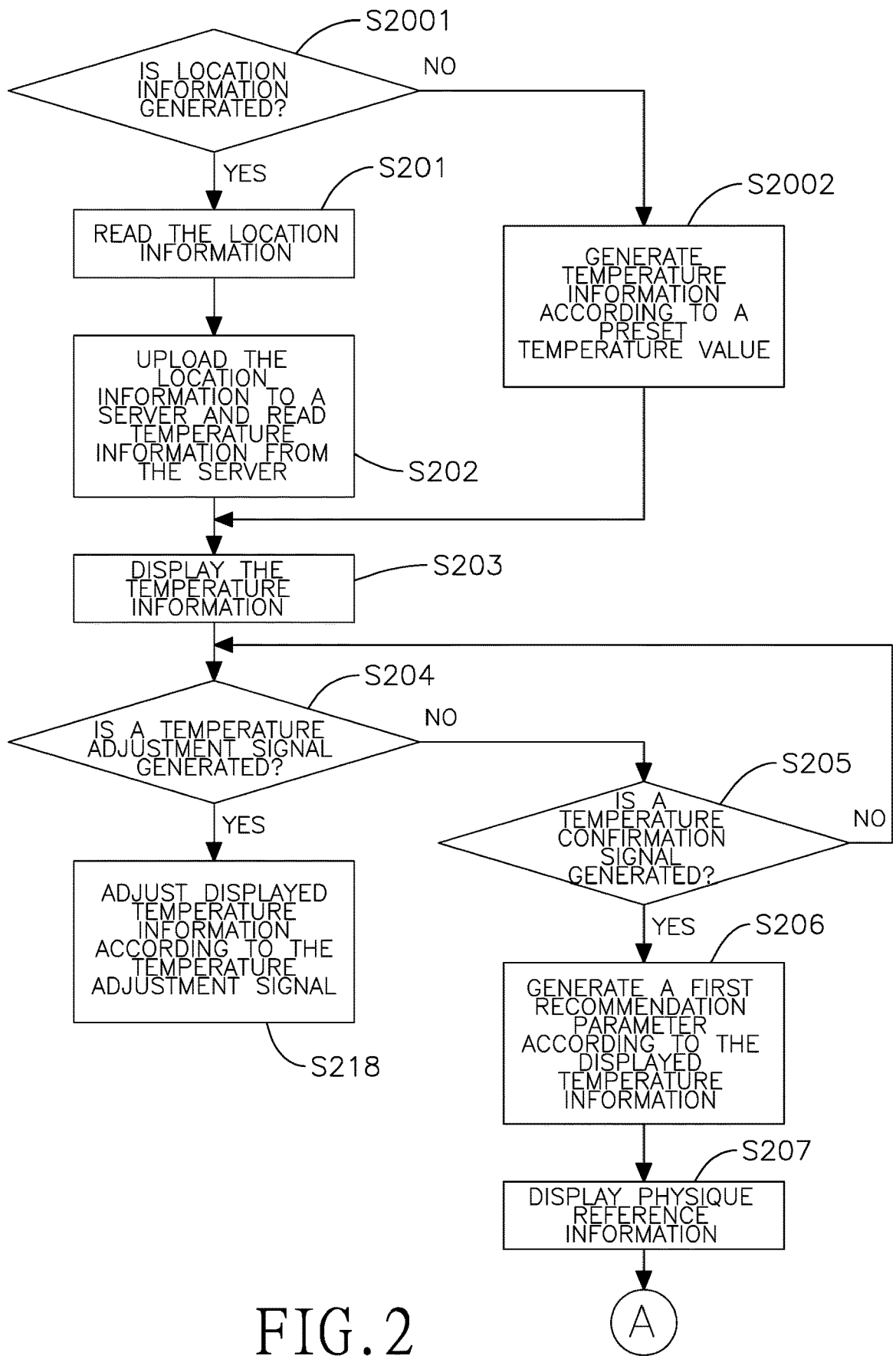
FIGS. 2 and 3 are flow charts of the information recommendation method of the present invention.
Figure 3:
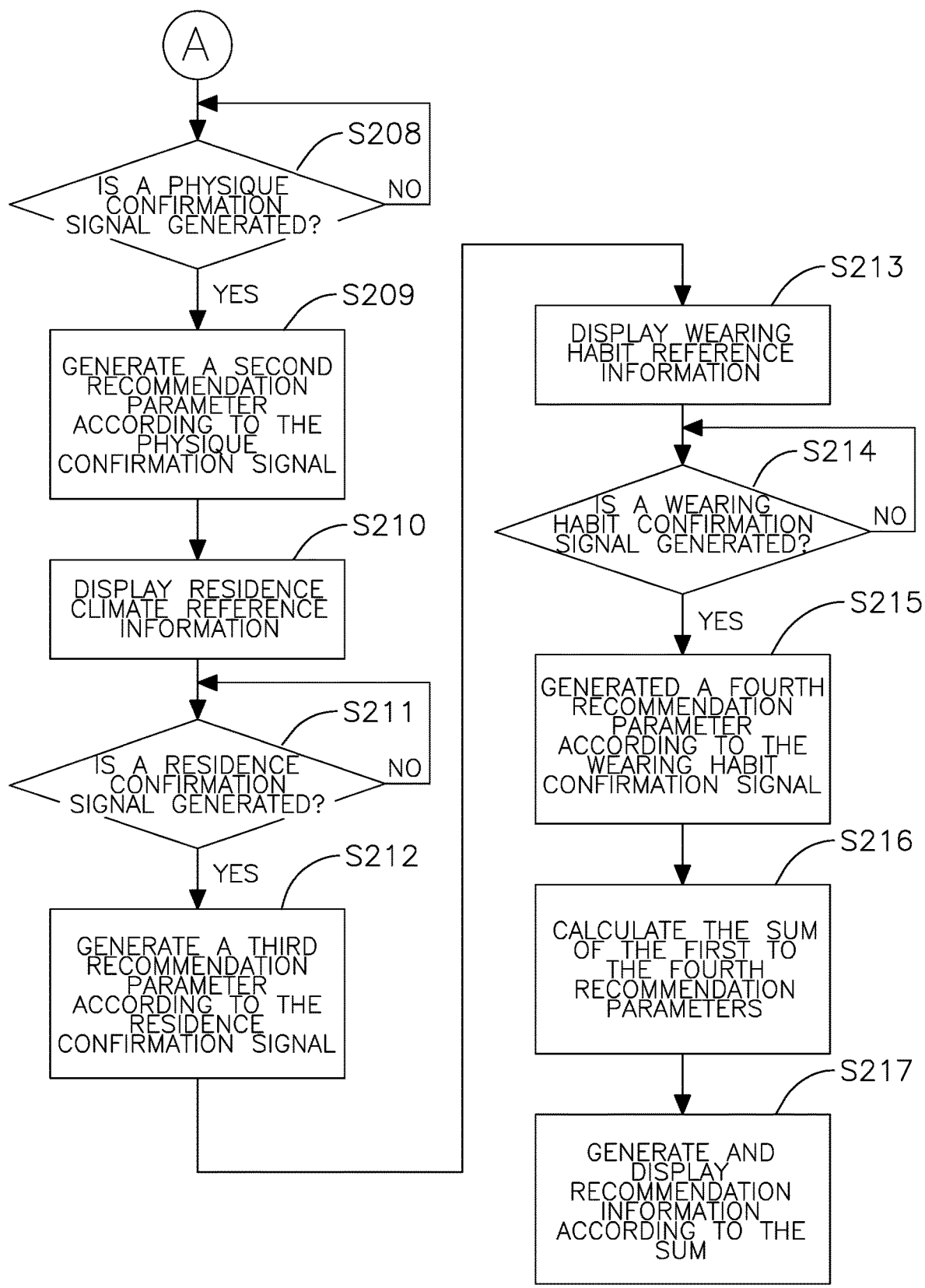

Please refer to FIG. 2 and FIG. 3, the information recommendation method is executed by the information recommendation system, and includes the following steps.

Read a location information (S201)

Upload the location information to a server, and read temperature information related to the uploaded location information from the server (S202);

Display the temperature information (S203), and

Determine whether a temperature adjustment signal is generated (S204);

When the temperature adjustment signal is not generated, determine whether a temperature confirmation signal is generated (S205).

After the temperature confirmation signal is generated, generate a first recommendation parameter according to the displayed temperature information (S206), then display the physique reference information (S207) and determine whether a physique confirmation signal is generated (S208).

After the physique confirmation signal is generated, generate a second recommendation parameter according to the physique confirmation signal (S209), then display a residence climate reference information (S210), and determine whether a residence confirmation signal is generated (S211);

After the residence confirmation signal is generated, generate the third recommendation parameter according to the residence confirmation signal (S212), then display a wearing habit reference information (S213), and determine whether a wearing habit confirmation signal is generated (S214);

After the wearing habit confirmation signal is generated, generate the fourth recommendation parameter according to the wearing habit confirmation signal (S215), then calculate the sum of the first recommendation parameter to the fourth recommendation parameter (S216), generate recommendation information according to the sum, and display the recommendation information (S217).

In addition, before the step of reading location information (S201), the following steps are also included:

Determine whether the location information is generated (S2001);

When the location information is generated, read the location information (S201);

When the location information is not generated, generate the temperature information according to the preset temperature value (S2002), and display the temperature information (S203).

Further, when the temperature adjustment signal is generated, adjust the displayed temperature information according to the temperature adjustment signal (S218). When the temperature confirmation signal is not generated, re-determine whether the temperature adjustment signal is generated.

In this way, the user can generate the temperature confirmation signal, the physique confirmation signal, the residence confirmation signal, and the wearing habit confirmation signal by operating on the user interface 14 accordingly; and the first to the fourth recommendation parameters are respectively generated according to the corresponding temperature information and confirmation signals mentioned above; and the processing unit 15 further calculates the sum of the first to the fourth recommendation parameters, and generates the recommendation information according to the sum. Hence, the recommendation information is generated by reference to the climate and the ambient temperature of the user's residence as well as the physique and wearing habits of the user; hence the recommended products of the recommendation information can better fit to the living environment, physique and wearing habits of the user, thereby the fitness between the product and the user is improved, and the chances of waste due to unfitness is reduced.

For example, the information recommendation system is a personal computer and so on; the location information generating unit 11 is a global positioning system (GPS) and so on for generating the current location of the information recommendation system; the display unit 13 is a display with a screen and so on; the user interface 14 can be a keyboard, a mouse or a touchpad and so on.

Figure 4:
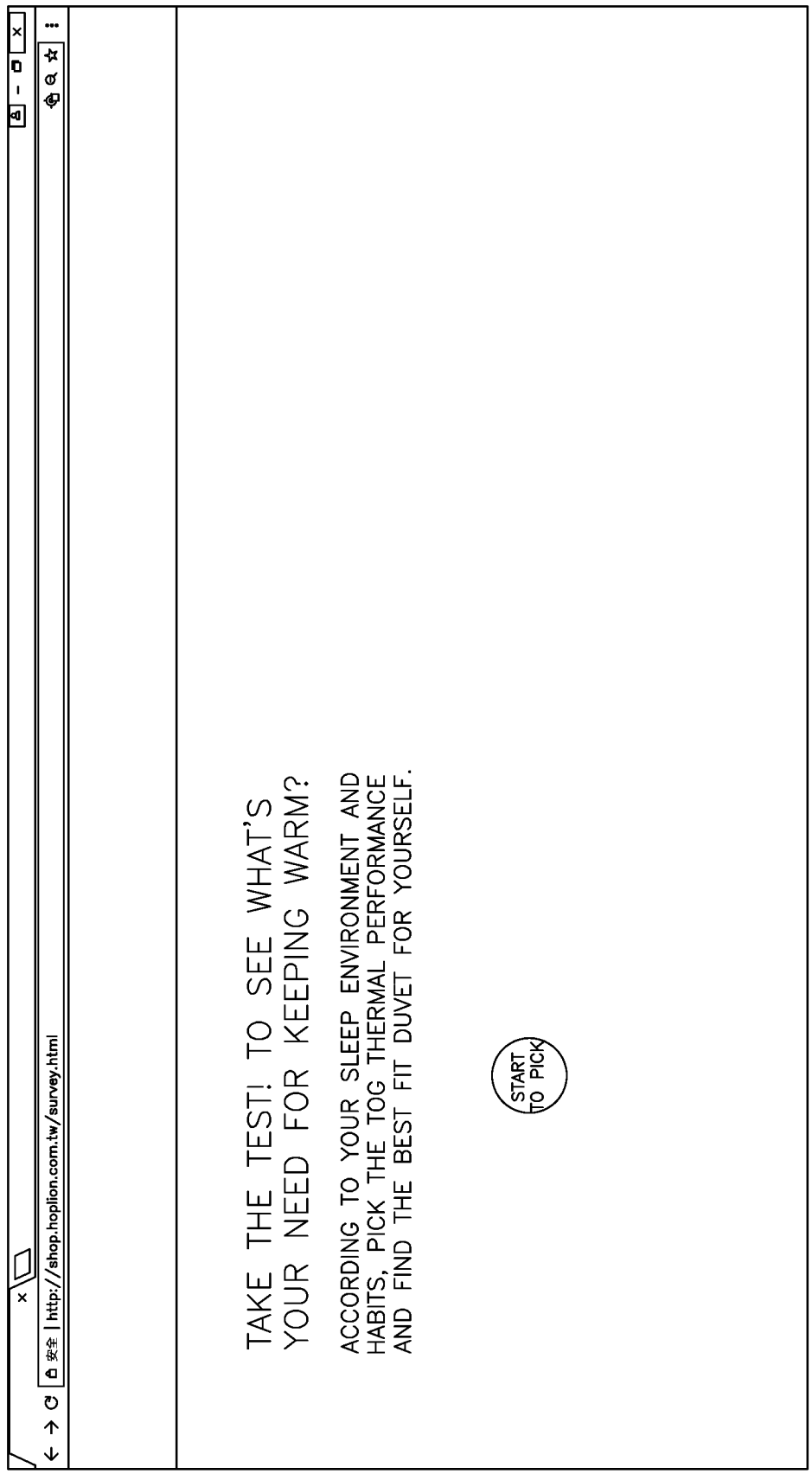
FIG. 4-FIG. 9 are schematic views of the states of a preferred embodiment of the present invention.

With reference to FIG. 4, first, through the user interface 14 such as a mouse, the display unit 13 first displays a waiting-for-input screen with an on-screen button "Start" for the user to click on to select.

Figure 5:
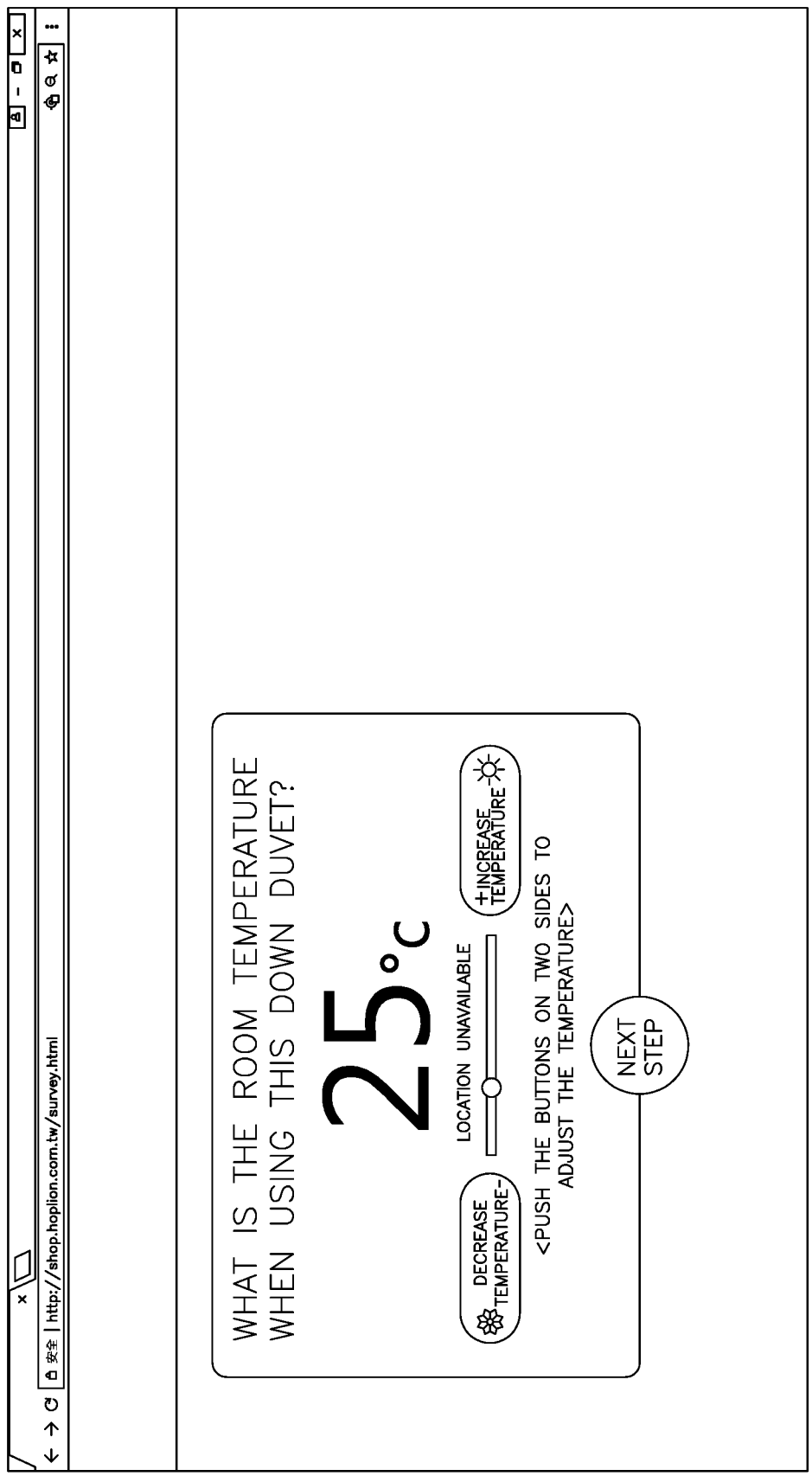

Referring to FIG. 5, when the on-screen button "Start to Pick" shown in FIG. 4 is clicked on, the processing unit 15 first determines whether the location information generating unit 11 generates the location information, and when the location information generating unit 11 generates the location information, the processing unit 15 reads the location information generated by the location information generating unit 11 and uploads the location information through the network unit 12 to the server 20 which can be a weather station server and so on. A weather station server can generate the temperature information according to the location information. For example, when the location information indicates Taipei, the weather station server can generate the current temperature information of Taipei like 25° C. according to the location information, and then the processing unit 15 can download and read the current temperature information of Taipei from the weather station server, and the processing unit 15 will display the temperature information 25° C. through the display unit 13.

Further, if the location information generating unit 11 does not generate the location information, then the processing unit 15 won't be able to read the location information generated by the location information generating unit 11, nevertheless the processing unit 15 is configured to still generate temperature information according to the preset temperature. For example, assume the temperature information corresponding to the preset temperature value is 25° C. and when the location information generating unit 11 does not generate the location information, the processing unit 15 will then directly display the temperature information 25° C. through the display unit 13.

In addition, the screen of the display unit 13 also displays on-screen buttons of "reduce temperature", "increase temperature" and "next step". Through the user interface 14, when the user selects the on-screen buttons "decrease temperature" or "increase temperature", the user interface 14 will generate the temperature adjustment signal for adjusting the temperature information and the temperature adjustment signal is displayed by the display unit 13. When the user clicks on the on-screen button "next step" through the user interface 14, the user interface 14 will generate the temperature confirmation signal to confirm that the current temperature is correct on behalf of the user.

Next, when the on-screen button "next" of FIG. 5 is clicked on, the processing unit 15 generates the first recommendation parameter according to the temperature information displayed by the display unit 13. For example, if the temperature information displayed by the display unit 13 is between 5° C. and 14° C., the first recommendation parameter is 20, and if the temperature information displayed by the display unit 13 is between 15° C. and 24° C., the first recommendation parameter is 10, and if the temperature information displayed by the display unit 13 is between 25° C. and 30° C., the first recommendation parameter is 1.

Figure 6:
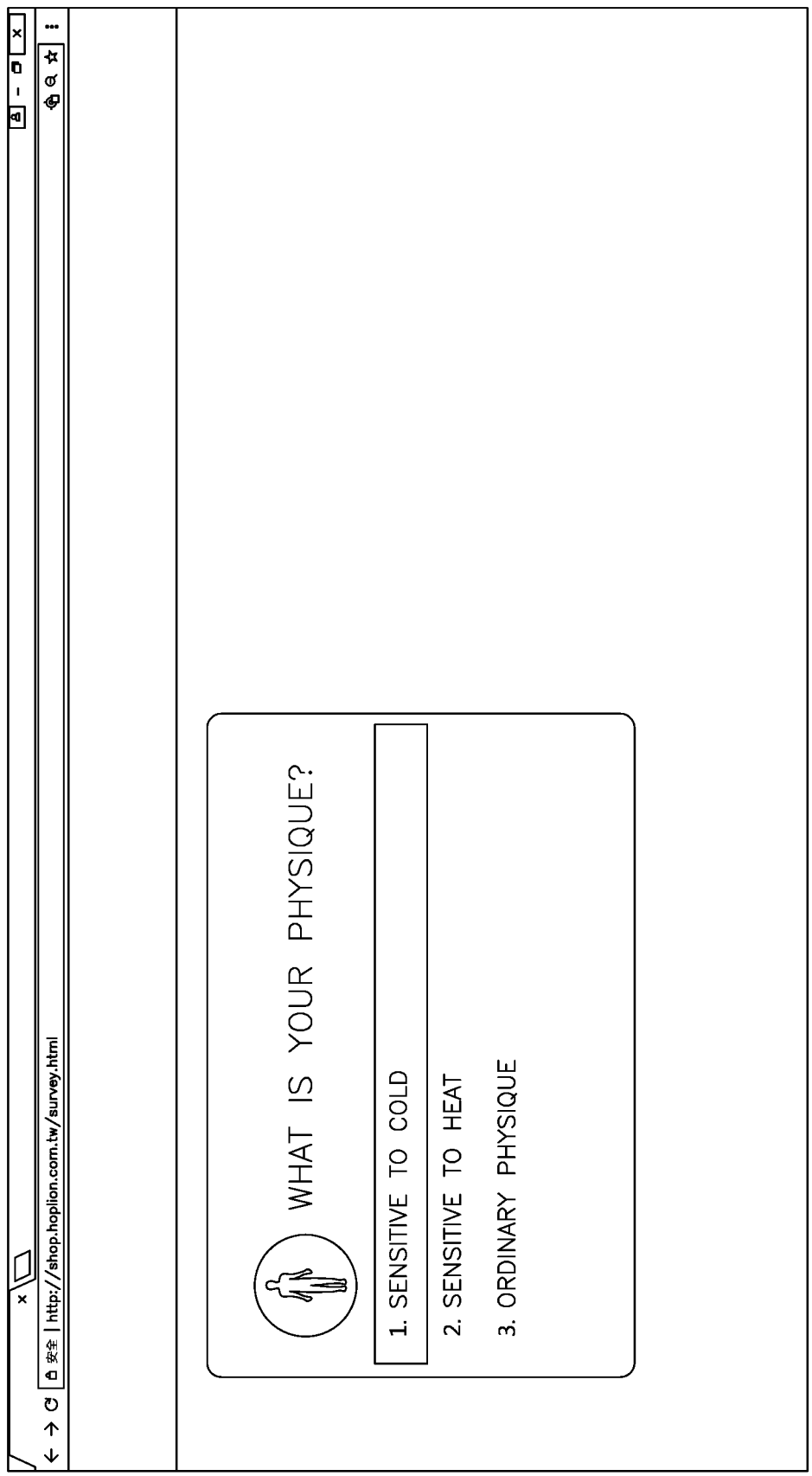

Referring to FIG. 6, after the processing unit 15 generates the first recommendation parameter, the processing unit 15 displays the physique reference information through the display unit 13. At this moment, as displayed by the display unit 13, the on-screen buttons such as "sensitive to cold", "sensitive to heat" and "ordinary physique" are provided for the user to click on.

After the user selects the on-screen buttons "sensitive to cold", "sensitive to heat", or "ordinary physique", the user interface 14 generates the physique confirmation signal indicating the on-screen button been selected, and then the physique confirmation signal is used to calculate the second recommendation parameter. For example, if the on-screen button "sensitive to cold" displayed by the display unit 13 is selected, the second recommendation parameter is 5, and if the on-screen button "ordinary physique" is selected, the second recommendation parameter is 3, and if the on-screen button "sensitive to heat" is selected, the second recommendation parameter is 1.

Figure 7:
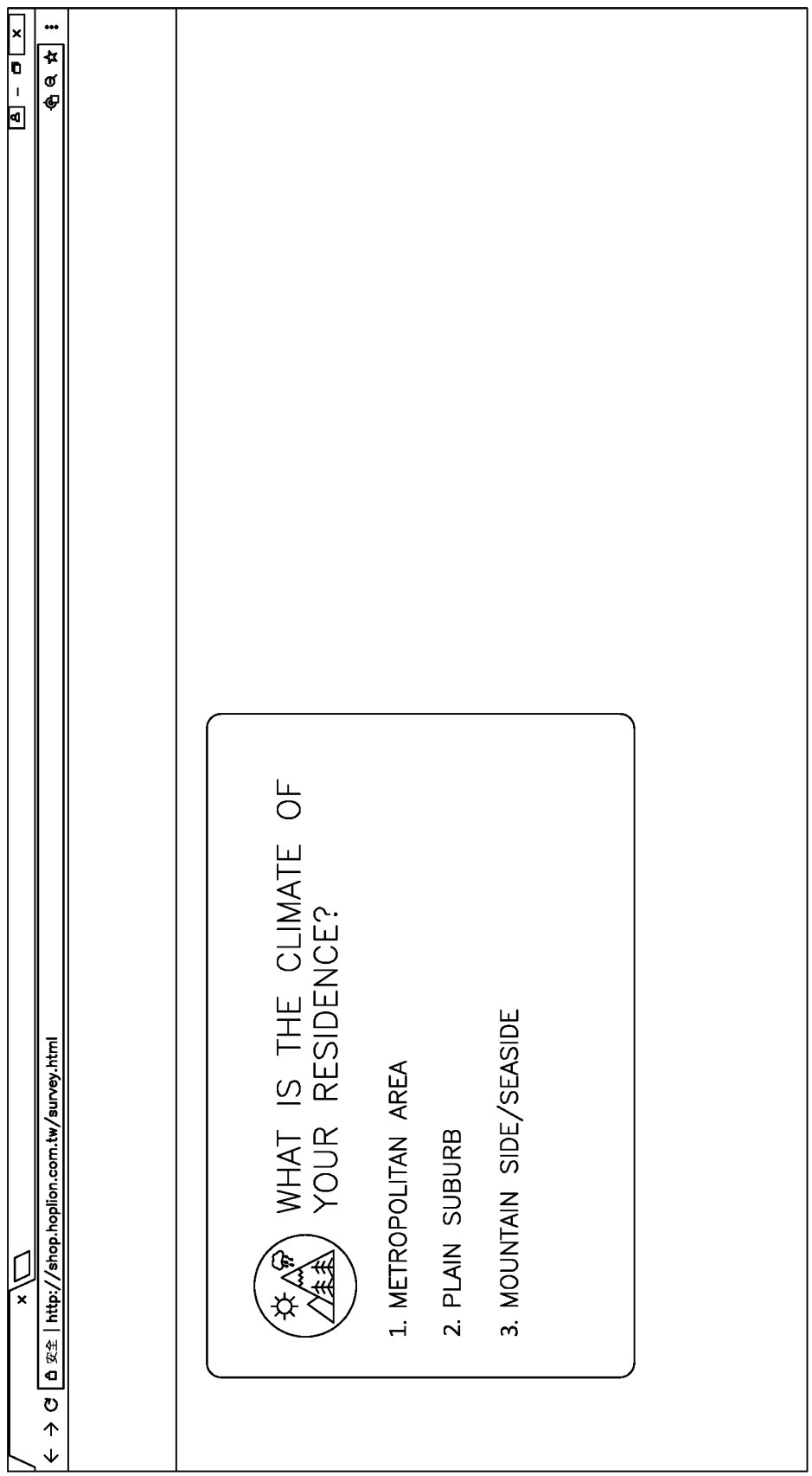

Next, referring to FIG. 7, after the processing unit 15 generates the second recommendation parameter, the processing unit 15 displays the residence climate reference information through the display unit 13. At this moment, as displayed by the display unit 13, the on-screen buttons such as "metropolitan area", "plain suburb", and "mountain side/seaside" are provided for the user to click on.

After the user selects the on-screen buttons "metropolitan area", "plain suburb", or "mountain side/seaside", the user interface 14 will generate the residence confirmation signal indicating the on-screen button been selected, and then the residence confirmation signal is used to calculate the third recommendation parameter. For example, if the on-screen button "mountain side/seaside" displayed by the display unit 13 is selected, the third recommendation parameter is 3, and if the on-screen button "plain suburb" is selected, the third recommendation parameter is 2, and if the on-screen button "metropolitan area" is selected, the third recommendation parameter is 1.

Figure 8:
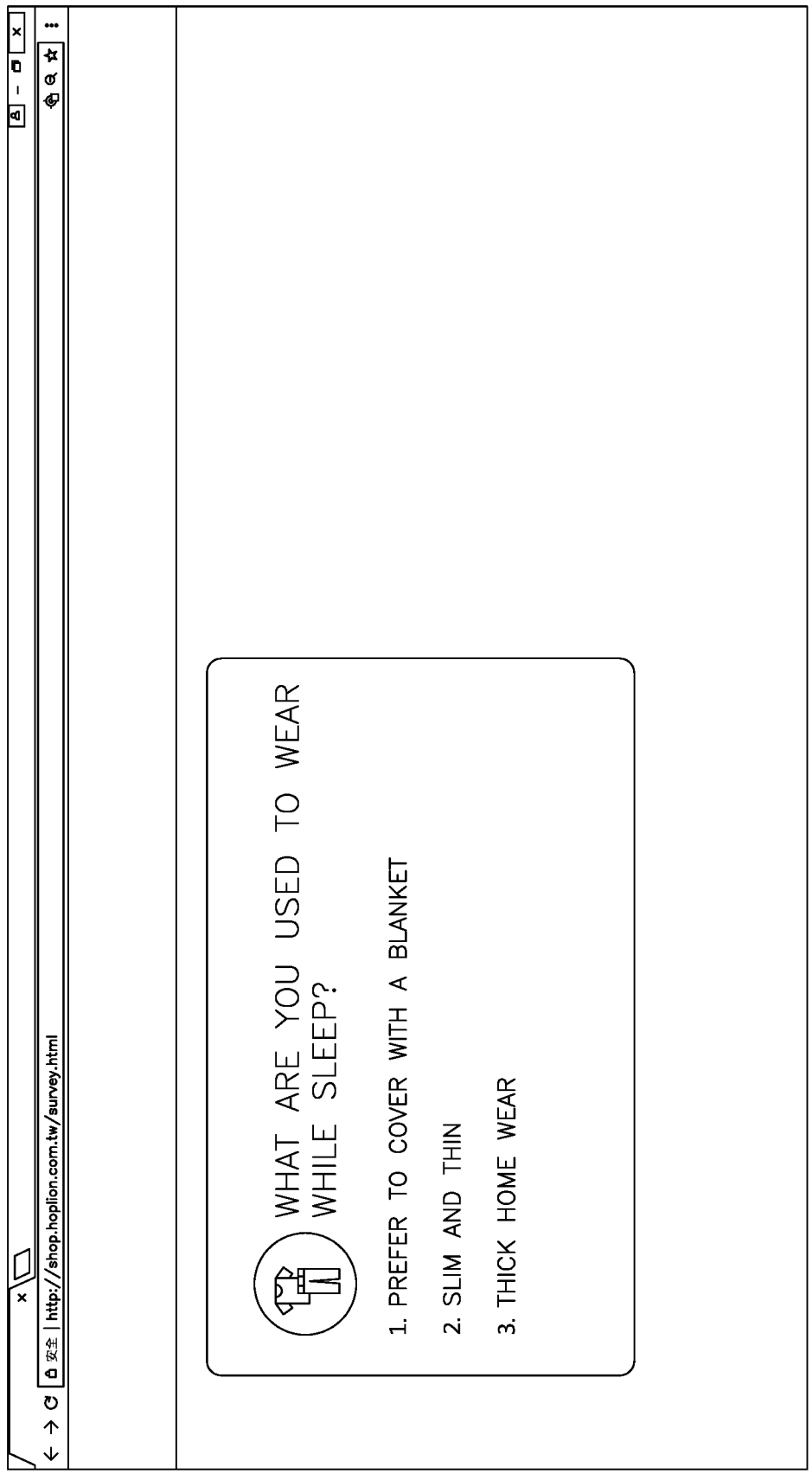

Referring to FIG. 8, after the processing unit 15 generates the third recommendation parameter; the processing unit 15 displays the wearing habit reference information through the display unit 13. At this moment, as displayed by the display unit 13, the on-screen buttons such as "prefer to cover with a blanket", "slim and thin", and "thick home wear" are provided for the user to click on.

After the user selects the on-screen buttons "prefer to cover with a blanket", "slim and thin" or "thick home wear" through the user interface 14, the user interface 14 will generate the wearing habit confirmation signal indicating the on-screen button been selected, and then the wearing habit confirmation signal is used to calculate the fourth recommendation parameter. For example, if the on-screen button "prefer to cover with a blanket" displayed by the display unit 13 is selected, then the fourth recommendation parameter is 3, and if the on-screen button "slim and thin" is selected, then the first recommendation parameter is 1, and if the on-screen button "thick home wear" is selected, then the fourth recommendation parameter is 2.

Figure 9:
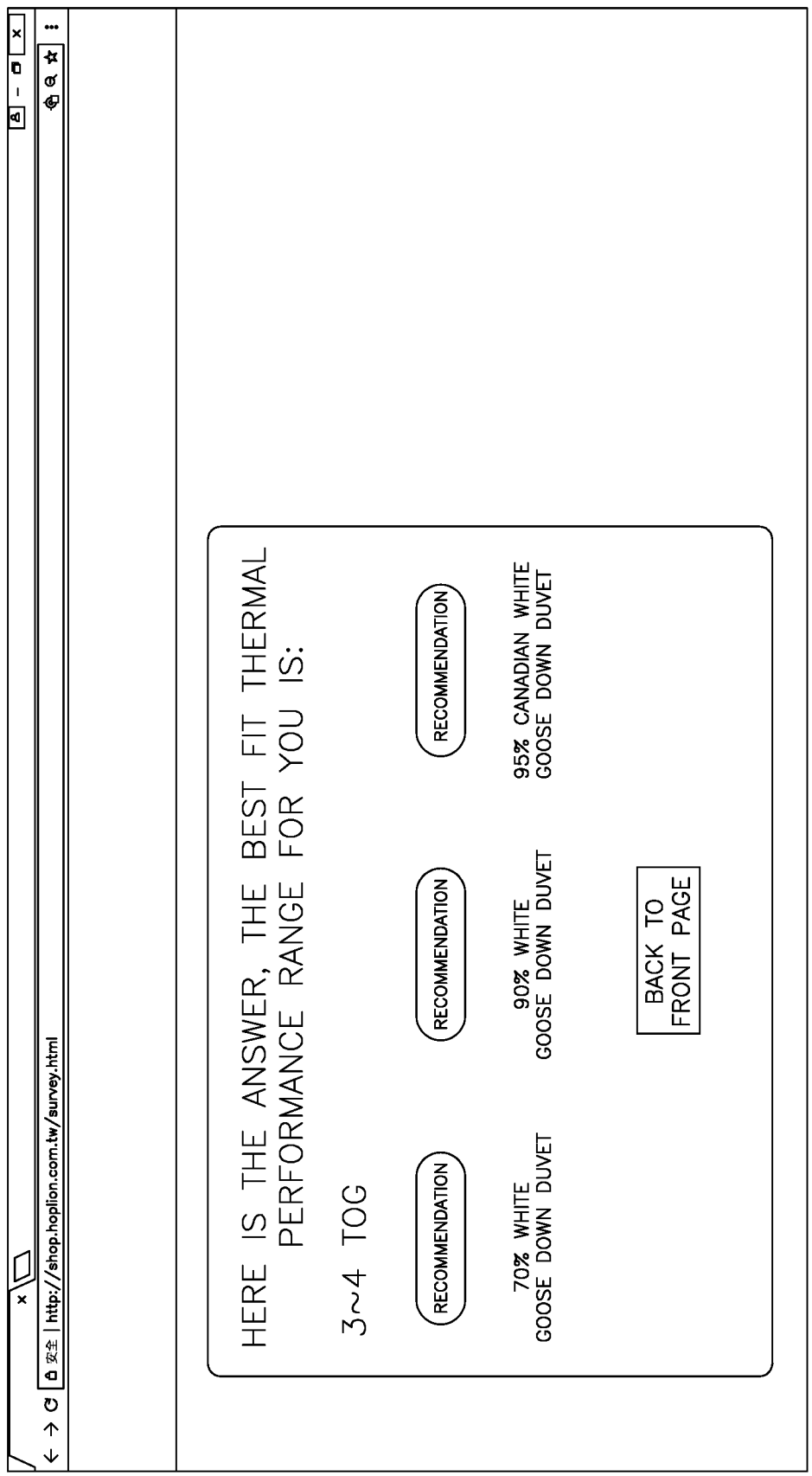

Finally, with reference to FIG. 9, after the processing unit 15 generating the fourth recommendation parameter, the processing unit 15 further calculates a sum of the first recommendation parameter to the fourth recommendation parameter, thereby generates the recommendation information which is then displayed accordingly. In the preferred embodiment, when the sum value calculated by the processing unit 15 is in a first interval, the recommendation information generated is "3~4 TOG", wherein "TOG", commonly used in the textile industry, is a measure of thermal resistance of a unit area. When the value of the sum calculated by the processing unit 15 is in a second interval, the recommendation information generated is "6~7 TOG". When the value of the sum calculated by the processing unit 15 is in a third interval, the recommendation information generated is a "9~10 TOG". For example, the first interval is for values in 1~11, the second interval is for values in 13~17, and the third interval is for values in 18~30.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An information recommendation system for assisting and facilitating an online selection of a duvet product for a user based on a personalized recommendation information against a personal perceived temperature attribute, the system including:
a system server configured to store computer readable instructions which include an online testing module to generate recommendation parameters including a first, a second, a third and a fourth recommendation parameters to collect a user selection for assessing the personal perceived temperature attribute of the user and a recommendation module to determine the personalized recommendation information for the user based on the recommendation parameters, and a TOG interval classification including converting information on the personalized recommendation information against the personal perceived temperature attribute;
a weather station server being capable of generating a temperature information according to a location information; and
a personal computer in a remote end separated from the system server and the weather station server and including:
a global positioning system (GPS) unit which generates the location information;
a network unit which provides an Internet connection to the system server and the weather station server;
a display unit configured to show an internet browser for the user to operate;
a user interface shown in the internet browser and configured to provide and show the online testing module for the user to operate and receive a user's response from the user; and
a processing unit electrically connected to the GPS unit, the network unit, the display unit and the user interface and configured to load the computer readable instructions and the TOG interval classification;
wherein the online testing module includes instructions, which when executed by the processing unit, cause the processing unit to:
receive the location information sent from the GPS unit and transmit the location information to the weather station server through the network unit, to retrieve the temperature information returned from the weather station server;
display an application room temperature self-assessment window including a temperature adjustment track and a slider residing on the temperature adjustment track, in which the temperature information is used as an initial temperature, for the user to operate to input an application room temperature as the user's response by dragging the slider over the temperature adjustment track via the user interface in the internet browser;
generate and set the first recommendation parameter to 20 if the responded application room temperature is ranged between 5° C. and 14° C., set the first recommendation parameter to 10 if the responded application room temperature is ranged between 15° C. and 24° C., and set the first recommendation parameter to 1 if the responded application room temperature is ranged between 25° C. and 30° C.;
display a personal temperature sensitivity self-assessment window including options for the user to select to input a physique reference information as the user's response via the user interface in the internet browser, and generate and set the second recommendation parameter to 5 if the responded physique reference information is the option of sensitive to cold, set the second recommendation parameter to 3 if the responded physique reference information is the option of ordinary physique, and set the second recommendation parameter to 1 if the responded physique reference information is the option of sensitive to heat;
display a residence climate condition self-assessment window including options for the user to select to input a residence climate reference information as the user's response via the user interface in the internet browser, and generate and set the third recommendation parameter to 3 if the responded residence climate reference information is the option of mountain side/seaside, set the third recommendation parameter to 2 if the responded residence climate reference information is the option of plain suburb, and set the third recommendation parameter to 1 if the responded residence climate reference information is the option of metropolitan area; and display a common wearing habit self-assessment window including options for the user to select to input a common wearing habit reference information as the user's response via the user interface in the internet browser, and generate and set the fourth recommendation parameter to 3 if the responded common wearing habit reference information is the option of preferring to cover with a blanket, set the fourth recommendation parameter to 2 if the responded common wearing habit reference information is the option of slim and thin, and set the fourth recommendation parameter to 1 if the responded common wearing habit reference information is the option of thick home wear, wherein the recommendation module includes instructions, which when executed by the processing unit, cause the processing unit to:

load the TOG interval classification, add up the first recommendation parameter to the fourth recommendation parameter to obtain a total sum which represents for the personal perceived temperature attribute for the user, according to the TOG interval classification, generate and assign a recommendation information with 3-4 TOG if the total sum is ranged between a first interval of 1-12, assign the recommendation information with 6-7 TOG if the total sum is ranged between a second interval of 13-17, and assign the recommendation information with 9-10 TOG if the total sum is ranged between a third interval of 18-30, and enable the internet browser to display the user interface to show the recommendation information which is the personalized recommendation information for the user.

2. An information recommendation method for assisting and facilitating an online selection of a duvet product for a user based on a personalized recommendation information against a personal perceived temperature attribute, the method including the following steps:

storing computer readable instructions which include an online testing module to generate recommendation parameters including a first, a second, a third and a fourth recommendation parameters to collect a user selection for assessing the personal perceived temperature attribute of the user and a recommendation module to determine the personalized recommendation information for the user based on the recommendation parameters, and a TOG interval classification including converting information on the personalized recommendation information against the personal perceived temperature attribute in a system server;

generating a location information by a global positioning system (GPS) unit and receiving the location information sent from the GPS unit;

transmitting the location information to a weather station server which generates a temperature information according to the location information, and then retrieving the temperature information returned from the weather station server;

causing a processor to load from the system server the online testing module included in the computer readable instructions and including instructions, which when executed by the processor, cause the processor to:

display an application room temperature self-assessment window including a temperature adjustment track and a slider residing on the temperature adjustment track, in which the temperature information is used as an initial temperature, for the user to operate to input an application room temperature as the user's response by dragging the slider over the temperature adjustment track via a user interface in an internet browser;

generate and set the first recommendation parameter to 20 if the responded application room temperature is ranged between 5° C. and 14° C., set the first recommendation parameter to 10 if the responded application room temperature is ranged between 15° C. and 24° C., and set the first recommendation parameter to 1 if the responded application room temperature is ranged between 25° C. and 30° C.;

display a personal temperature sensitivity self-assessment window including options for the user to select to input a physique reference information as the user's response via the user interface in the internet browser, and generate and set the second recommendation parameter to 5 if the responded physique reference information is the option of sensitive to cold, set the second recommendation parameter to 3 if the responded physique reference information is the option of ordinary physique, and set the second recommendation parameter to 1 if the responded physique reference information is the option of sensitive to heat;

display a residence climate condition self-assessment window including options for the user to select to input a residence climate reference information as the user's response via the user interface in the internet browser, and generate and set the third recommendation parameter to 3 if the responded residence climate reference information is the option of mountain side/seaside, set the third recommendation parameter to 2 if the responded residence climate reference information is the option of plain suburb, and set the third recommendation parameter to 1 if the responded residence climate reference information is the option of metropolitan area; and display a common wearing habit self-assessment window including options for the user to select to input a common wearing habit reference information as the user's response via the user interface in the internet browser, and generate and set the fourth recommendation parameter to 3 if the responded common wearing habit reference information is the option of preferring to cover with a blanket, set the fourth recommendation parameter to 2 if the responded common wearing habit reference information is the option of slim and thin, and set the fourth recommendation parameter to 1 if the responded common wearing habit reference information is the option of thick home wear; and causing a processor to load from the system server the recommendation module included in the computer readable instructions and including instructions, which when executed by the processor, cause the processor to:

load the TOG interval classification, add up the first recommendation parameter to the fourth recommendation parameter to obtain a total sum which represents for the personal perceived temperature attribute for the user, according to the TOG interval classification, generate and assign a recommendation information with 3-4 TOG if the total sum is ranged between a first interval of 1-12, assign the recommendation information with 6-7 TOG if the total sum is ranged between a second interval of 13-17, and assign the recommendation information with 9-10 TOG if the total sum is ranged between a third interval of 18-30, and enable the internet browser to display the user interface to show the recommendation information which is the personalized recommendation information for the user.

\* \* \* \* \*